United States Patent [19]
Plante

[11] Patent Number: 5,363,891
[45] Date of Patent: Nov. 15, 1994

[54] TUBULAR SAW TOOTH AND MOUNT ASSEMBLY

[76] Inventor: Fernand Plante, 700 Laurier, Malartic, Quebec, Canada, J0Y 1Z0

[21] Appl. No.: 148,339

[22] Filed: Nov. 8, 1993

[51] Int. Cl.⁵ .................. B27L 1/00; B27G 13/00
[52] U.S. Cl. ...................... 144/218; 83/853; 144/2 Z; 144/34 R; 144/162 R; 144/176; 144/241; 407/7; 407/48; 407/62
[58] Field of Search ............... 83/698, 835, 838, 839, 83/840, 841, 842, 845, 853; 144/2 Z, 34 R, 218, 162 R, 176, 241; 407/7, 48, 51, 60, 61, 62, 114, 115

[56] References Cited

U.S. PATENT DOCUMENTS

| | | | |
|---|---|---|---|
| 192,090 | 6/1877 | Spaulding | 83/853 |
| 297,816 | 4/1884 | Ledward | 83/853 |
| 3,327,746 | 6/1967 | Andrews et al. | 144/241 |
| 3,675,693 | 7/1972 | I'Anson | 144/172 |
| 3,860,051 | 1/1975 | Anson | 144/241 |
| 4,222,298 | 9/1980 | James | 83/853 |
| 4,311,175 | 1/1982 | Drummond | 144/241 |
| 4,738,291 | 4/1988 | Isley | 144/241 |
| 4,932,447 | 6/1990 | Morin | 144/34 R |
| 5,211,212 | 5/1993 | Carlson et al. | 144/241 |
| 5,261,306 | 11/1993 | Morey et al. | 144/241 |

Primary Examiner—W. Donald Bray
Attorney, Agent, or Firm—Pierre Lesperance; Francois Martineau

[57] ABSTRACT

In one embodiment of saw tooth assembly, the tubular saw tooth is releasably inserted with friction fit inside the hollow of a tubular mount. In an alternate embodiment, it is the tubular mount which is releasably inserted with friction fit inside the hollow of the tubular tooth. In both cases, the hollows of the mount and tooth are coextensive, whereby a common axial through-channel is defined. The tubular mount is to be anchored to the peripheral edge of a circular saw discoid plate. The wood chip generated during circular saw operation can therefore freely engage through the common through-channel, i.e. through the whole saw tooth assembly, and escape therefrom. Wood chip clogging of the saw tooth during sawing operations is therefore substantially prevented, and the aerodynamic features of the circular are accordingly enhanced.

4 Claims, 3 Drawing Sheets

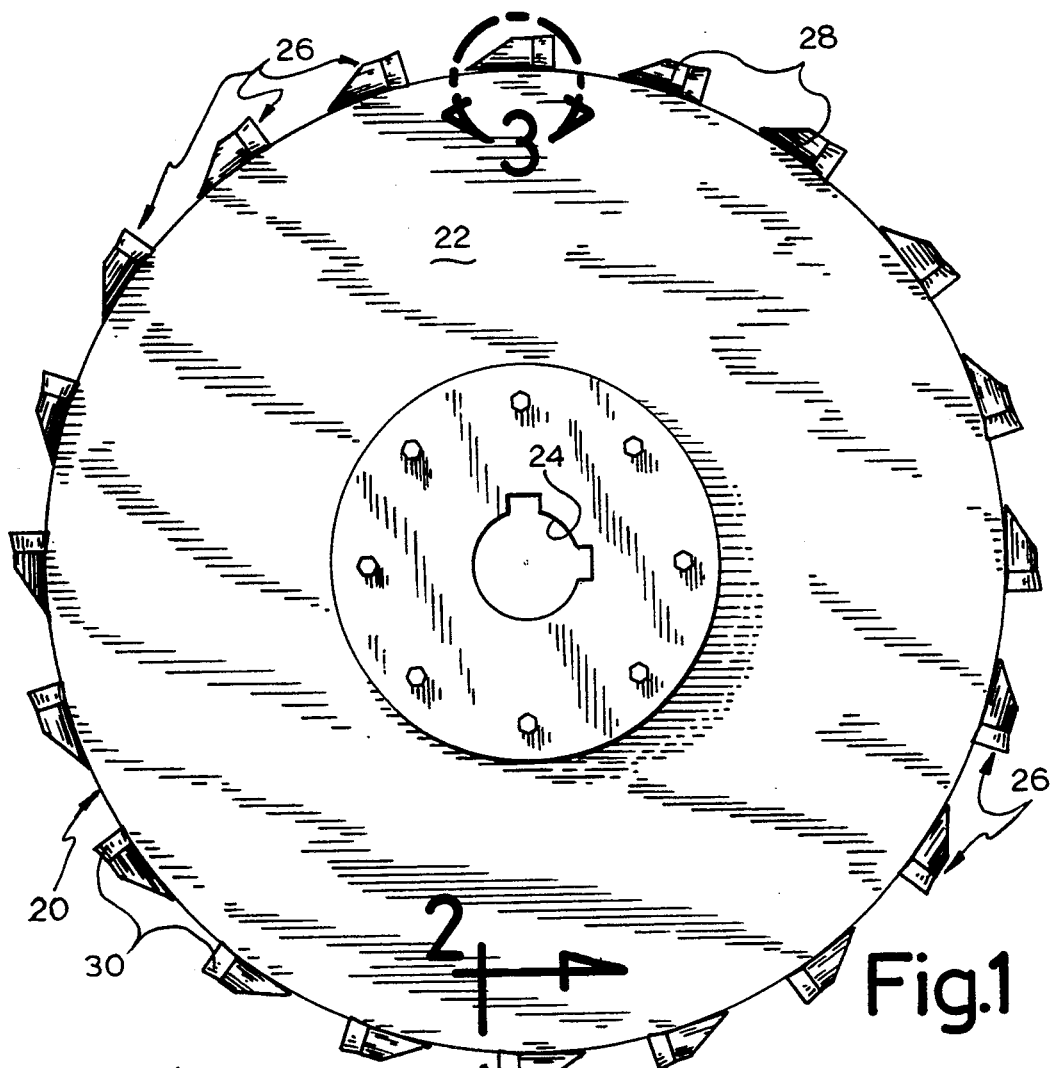
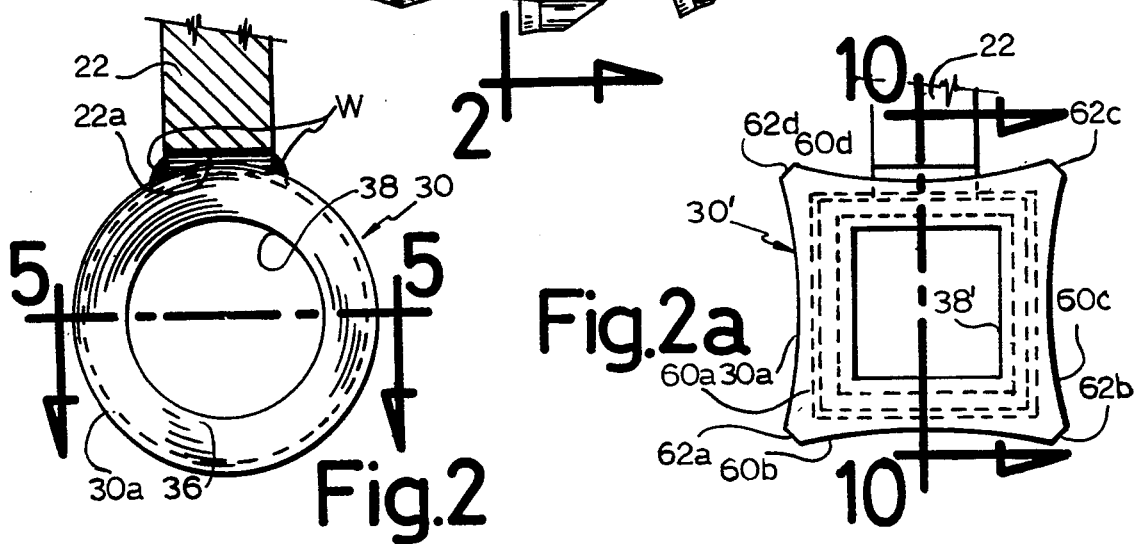

TUBULAR SAW TOOTH AND MOUNT ASSEMBLY

FIELD OF THE INVENTION

This invention relates to cutting teeth for circular saws used in wood logging operations.

BACKGROUND OF THE INVENTION

In wood logging operations, circular saws are used. Among these circular saws, some consist of a discoid plate provided at its periphery with a plurality of successively spaced teeth. Upon driving in rotation the circular saw, these teeth are accordingly brought into rapid translation whereby tangential engagement of tree stump by the circular saw will enable sectioning thereof under shearing action.

Understandably, this shearing action generates a lot of wood chips. Moreover, wood logging is a physically demanding, messy work in a generally rough environment, whereby a lot of macroparticulate contaminants, including but not limited to the wood chips generated during wood cutting operations, come in contact with the circular saw. Concerns therefore exist with respect to the periodic clogging of the peripheral saw tooth, thus imposing periodic downtime for maintenance. Moreover, these massive teeth compromise the aerodynamic features of the circular saw.

To the knowledge of the present inventor, none of the prior art saw teeth help in controlling the wood chip clogging problem generated during wood cutting operations. For example, Canadian patent No. 1,222,930 issued Jun. 16, 1987 to Reggald ISLEY discloses at FIGS. 1 and 8 a tubular tooth 10, receiving a bolt 36 for securing the tooth to the part 32; this bolt 36 completely fills the hollow formed by the tubular tooth. U.S. Pat. No. 4,932,447 issued Jun. 12, 1990 to Armand MORIN (now deceased), discloses at FIG. 6 a tubular mount member 46, for receiving the shaft of a tooth (FIG. 7); this elongated tooth is not tubular. Similarly, U.S. Pat. No 2,736,352 issued in 1956 to John WRIGHT, discloses at FIG. 1 a saw tooth assembly with the shaft 1 of a tooth member engaging a tubular mount member 4, this mount member being anchored to the periphery of a circular saw discoid plate; again, this tooth member is full.

OBJECTS OF THE INVENTION

An important object of the invention is therefore to address the problem of saw tooth clogging during wood logging operations with powered circular saws.

Another important object of the invention is to provide a saw tooth assembly which will be more efficient during wood logging operations, particularly in requiring less energy output at the circular saw drive axle, as well as providing enhanced aerodynamic features to the rotating circular saw.

A further object of the invention is to circumvent the prior art requirement of having a bolt for securing the tooth to the circular saw.

SUMMARY OF THE INVENTION

In accordance with the teachings of the invention, there is disclosed a saw tooth assembly for use with a circular saw, said saw tooth assembly defining: a rigid tooth member, a rigid mount member for fixedly anchoring said tooth member against the peripheral edge of said circular saw, securing means for releasably interconnecting said tooth member and said mount member, said tooth member being generally tubular so as to define a first through-channel and a leading edge at a free end portion thereof, said mount member being also tubular so as to define a second through-channel, said first and second through-channels being coextensive to one another whereby said saw tooth assembly defines an upstream channel mouth and a downstream channel mouth, said upstream channel mouth being circumscribed by said tooth member leading edge, and said downstream channel mouth being located about a trailing edge at a free end portion of said mount member opposite said tooth member leading edge; wherein chipped material to be cut by said tooth member leading edge is engageable through said upstream channel mouth, into and through said first and then second through-channels, and through and beyond said downstream channel mouth, whereby through-flow of cut chipped material through said saw tooth assembly is enabled.

Preferably, said downstream channel mouth is tapered, whereby said through-flow of cut chipped material through said saw tooth assembly is to occur in a radially outward direction relative to the circular saw. Advantageously, said tubular tooth member and mount member are frusto-conical with said tooth member having a downstream portion, and said mount member through-channel having an intermediate portion, whereby said securing means for releasably interconnecting said tooth member and said mount member consists of a friction fit wedge-type interlocking engagement of said tooth member downstream portion into said through-channel downstream portion of the mount member. Said tubular mount member and said tubular tooth member could then define substantially coextensive radially outward free surfaces.

Profitably, said securing means includes means for setting an axial gap between said registering portions of said tooth member and mount member, whereby said axial gap provides a rotational play of said tooth member relative to said mount member.

Alternately, said tubular tooth member and mount member may be frusto-conical with said mount member having an upstream portion, and said through-channel of the tooth member having a downstream portion, wherein said securing means for releasably interconnecting said tooth member and said mount member consists of a friction fit wedge type interlocking engagement of said mount member upstream portion into said through-channel downstream portion of said tooth member.

It would then be envisioned that said tubular mount member define a downstream portion including at least one groove made lengthwisely of the radially outward surface thereof, said groove opening in register with said tooth member, said groove for use in guiding a shaft-like hammering tool for axially hammering out said tooth member away from said mount member, whereby said releasable securing means are concurrently released. Said mount member could then define an upstream end, and said tooth member an annular seat projecting radially inwardly from an intermediate section of the through-channel of said tooth member, said radially inward radial seat being provided for releasable abutting engagement by said mount member upstream end upon said tooth member sustaining a particularly rough impact blow.

This invention also extends to a tree delimbing circular saw including in combination: (a) a rotatable discoid plate member, to be power driven into rotation, said plate member defining an arcuate peripheral edge; (b) a number of hollow, rigid teeth members, defining a free leading edge for shearing wood and the like material; (c) a corresponding number of hollow, rigid support members, being fixedly anchored to said plate member peripheral edge in successively spaced fashion, each support member for supporting a corresponding one of said teeth members, and defining a free trailing edge located opposite the leading edge of said tooth member; (d) securing means, releasably interconnecting said tooth member and said support member; and (e) channel means, extending through the hollow of each thus formed pair of associated tooth member and support member, and defining an upstream mouth, being circumscribed by said tooth member leading edge, and a downstream mouth, being circumscribed by said support member trailing edge; said channel means extending through the plane of said discoid plate member tangentially thereof; wherein said upstream mouth constitutes an intake port, for entry of wood chips generated by the shearing action of said teeth members, said channel means constituting a through-passage for free passage of said wood chips through each pair of tooth member and support member, and said downstream mouth constitutes an outlet port for escape of said wood chips outwardly from said pair of tooth member and support member.

Preferably then, said securing means could be friction-fit wedge-type means which releasably interlock each pair of associated tooth member and support member.

BRIEF DESCRIPTION OF THE DRAWINGS

FIG. 1 is a plan view of a circular saw, being provided with a plurality of peripherally disposed saw tooth assemblies accordingly with the invention;

FIG. 2 is an end view at an enlarged scale of a first embodiment of saw tooth and associated fragmentary part of the circular saw, taken from perspective 2—2 of FIG. 1;

FIG. 2a is a view similar to FIG. 2, but for an alternate embodiment of saw tooth assembly;

FIG. 10 is a sectional view taken along line 10—10 of FIG. 2a.

DETAILED DESCRIPTION OF THE DRAWINGS

Figure 3:
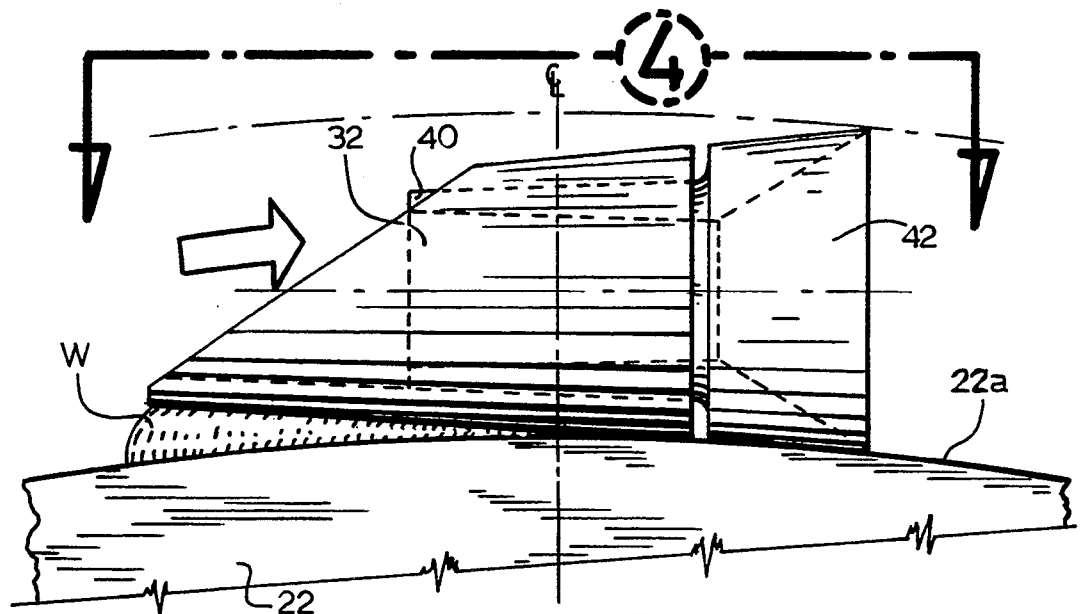
FIG. 3 is an enlarged view of the saw tooth assembly in the area circumscribed by area 3 of FIG. 1.

The circular saw 20 illustrated in FIG. 1 of the drawings includes a discoid plate 22, with a central keyed bore 24 for locking engagement by a rotatable drive shaft (not shown). The peripheral edge 22a of plate 22 receives a plurality of saw tooth assemblies 26, spaced from one another. Each saw tooth assembly 26 consists of an elongated mount member 28, fixedly anchored (e.g. by weld means W) tangentially to the discoid plate peripheral edge 22a, and a suitably hardened elongated tooth member 30, releasably anchored to the mount member 28 tangentially to the discoid plate. Mount 28 and tooth 30 extend through the plane of saw plate 22 (FIG. 2). Each saw tooth member 30 defines a sharp, leading, cutting edge 30a at its free outer (i e., . "upstream") end, all of the saw tooth leading edges 30a being oriented on the same side of the saw tooth assemblies 26 along the arcuate peripheral edge 22a of the discoid plate 22 (i.e., on the right hand side thereof from the perspective of FIG. 1).

For example, the diameter of the discoid plate 22 may be 55 inches, while that of tubular members 32, 42, may be about 2 inches; the plate 22 rotating e.g. at 1,000 rpm.

In the first embodiment of saw tooth assembly, illustrated in FIGS. 3-6, the mount member 28 defines an elongated, frusto-conical, sturdy body 32, of unitary construction. Body 32 has an inner, smooth-surfaced chamber 34 having an upstream open mouth 34a and an opposite, downstream open mouth 34b. As suggested in FIGS. 3 and 4, downstream mouth 34b is preferably tapered, i.e. that the length of the mount member body 32 progressively increases along a radially inward direction (relative to the discoid plate 22).

Tooth member 30 defines an elongated, conico-conical, sturdy body 36, also of unitary construction. Body 36 defines an inner channel 38 having an upstream open mouth 38a, a downstream open mouth 38b. Preferably, the upstream mouth 38a is diametrally larger than the downstream mouth 38b, while an intermediate channel section 38c is provided, section 38c being the diametrally smallest of the three.

Figure 4:
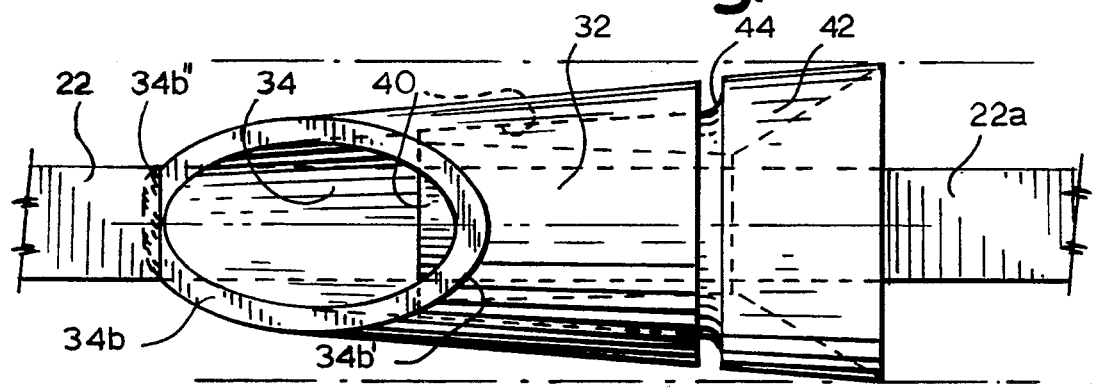
FIG. 4 is an edge view of a portion of the circular saw, taken along perspective 4 of FIG. 3.

Tooth body 36 further defines a downstream portion 40 (FIG. 4) and an upstream portion 42. Downstream portion 40 releasably engages through the mount upstream mouth 34a, and into the mount chamber 34. Portion 40 is of such external dimensions as to complementarily snugly frictionally fit inside mount chamber 34, upon the tooth body 40 reaching a fully inserted limit position. Preferably, upon the tooth portion 40 reaching said fully inserted limit position, the downstream end 38b of tooth portion 40 will extend slightly beyond the radially outward (relative to the discoid plate 22) portion of the mount tapered mouth 34b, at 34b', but well short of the radially inward portion 34b" of this mount tapered mouth (as illustrated in FIG. 4).

Upstream free tooth portion 42 is diametrally larger than downstream portion 40, whereby an annular radially outward step 44—forming the downstream end of upstream portion 42—is defined. As suggested in FIG. 5, in said fully inserted limit position of the tooth body 40, annular radial step 44 extends slightly short of the upstream end 34a of the mount member 28, i.e. is located spacedly upstream therefrom. This allows some minimal, load-yielding, rotational play of the tooth member 30 within the inner chamber of the mount member 28, should the circular saw 20 experience a temporary impact-borne surge in operation. The upstream edge of the upstream tooth portion 42—circumscribing upstream tooth mouth 38a—forms the generally circular, sharp cutting edge 30a. Preferably, the external surface of upstream tooth portion 42 is coextensive with (but spaced from the upstream end 34a of) mount member 28.

The inventive features of the invention may now be readily understood. As circular saw 20 is energized and powerdriven into rapid rotation, it is to be tangentially brought generally horizontally against an upstanding tree, wherein the peripherally carried teeth 30 will engage the tree by their sharp edges 30a to progressively section the tree T. During tree sectioning (FIG. 6), wood particles from the tree T, such as wood chips C, are generated. As suggested by the arrows in FIG. 6, these wood chips C are then biased into the conico-conical (narrowing) inner channel portion of each hollow teeth 30, thanks in part to the conicity of the channel part 38 in the upstream portion 42 of the tooth 30. Thereafter, these wood chips C will engage the (widening) channel part in the downstream portion 40 of each hollow teeth 30, to then escape from the hollow tooth through the tooth downstream mouth 38b, into the channel 34 of the mount member, and finally through the (tapered) downstream mouth 34b of the mount member 28, outwardly therefrom.

It can now be understood why it is advantageous that the downstream mouth 34b of the mount member 28 be tapered: once wood chips C cut by the teeth circular sharp edges 30a will have tangentially engaged through the axial passages 38, 34, of the hollow tooth member 30 and mount member 28, respectively, and through and beyond this downstream mouth 34b of the mount member 28, the wood chips will have been desirably biased, radially outwardly relative to the discoid plate 22. This will occur, since wood particle flow through each tooth inner channel 38 will be heavy, and, due to the orientation of this downstream mouth 34b, the wood chips C will in effect be deflected to follow the route with the least resistance to flow, namely, a path of travel transverse to the plane intersecting the tapered downstream mouth 34b of the mount member 28.

Hence, both the tooth 30 and the mount member 28 are hollow, with the tooth 30 frictionally engaging inside the hollow 34 of the mount member 28, whereby free wood particle flow therethrough is enabled during wood cutting operations with the circular saw 20. Only the mount member 28 is anchored to the discoid template 22.

Various alternative tooth and mount member assemblies are envisioned. For example, in the preferred embodiment of FIGS. 7–8, instead of the annular radial step 44 being formed on the intermediate radially outward section 42 of the tooth member 30, (as in the first embodiment), now a step 144 can be alternately formed about the intermediate radially outward section 150 of the mount member 128. In such an embodiment, the downstream end portion 138b of the tooth member 130 would not engage inside the inner chamber 134 of the mount member 128, but rather, against a diametrally smaller upstream portion 152 of the mount member 128, as illustrated in FIG. 8. Radially smaller mount portion 152 would have a shape complementary to that of the channel portion corresponding to the radially larger section 138b, as illustrated. Preferably, and as clearly illustrated in FIG. 8, this mount member upstream portion 152 sits against or alternately, comes slightly short of a radially inwardly extending annular seat 154 formed within the tooth channel 138 intermediate thereof. Should the tooth member 130 on the rotating circular saw strike a rock during wood logging operations, annular seat 154 of tooth body 136 will prevent the tooth member 130 from axially tilting and becoming stuck against one side of the annular gap 144. Mount member 128 then consists of the radially thin, upstream portion 152 and a radially much thicker main downstream portion, 129.

Figure 7:
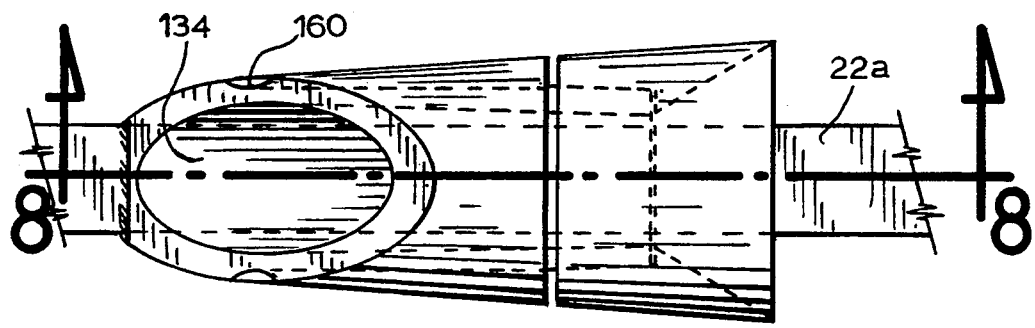
FIG. 7 is a view similar to FIG. 4, but showing an alternate embodiment of saw tooth assembly.
Figure 8:
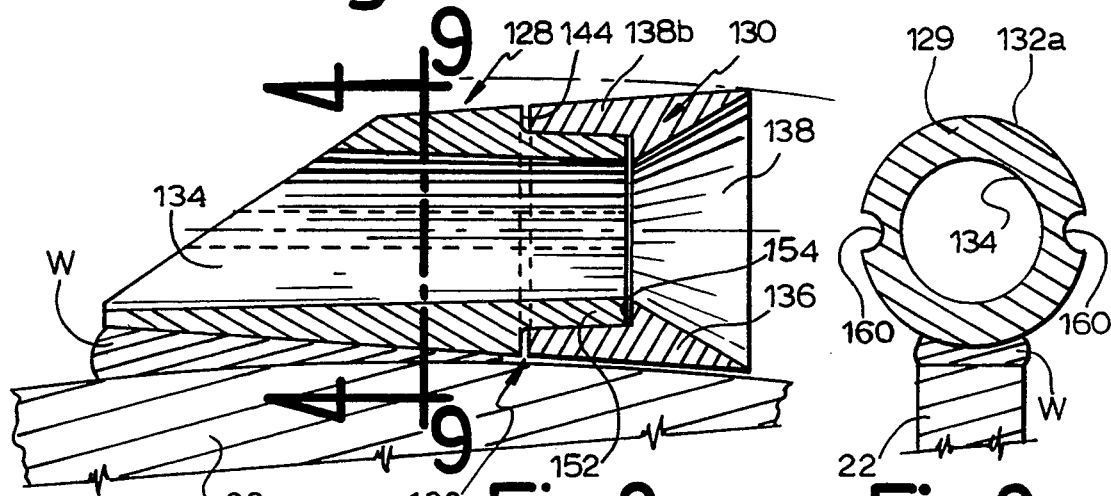
FIG. 8 is sectional view about line 8—8 of FIG. 7.

The embodiment of saw tooth assembly of FIGS. 7–8 is the preferred one, since, according to the present inventor:

(a) it is less expensive to manufacture; and
(b) it is longer lasting, since no deformation of the mount member 128 is to be expected during normal operations, due to the much greater thickness of the trailing (downstream) portion 129 (opposite portion 152 thereof) of the mount member 128, compared to that of the tooth member 138.

Figure 5:
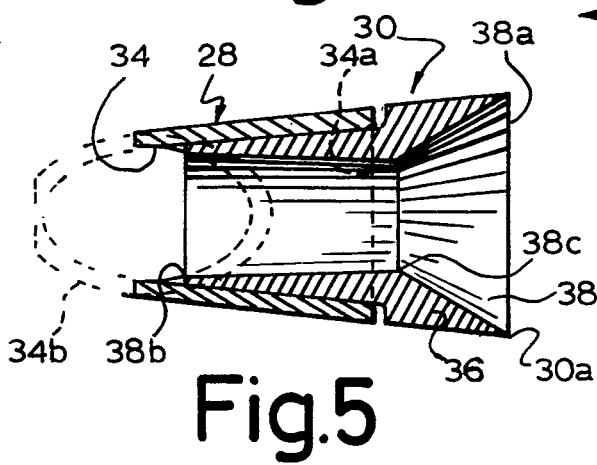
FIG. 5 is a sectional view taken along line 5—5 of FIG. 2.
Figure 6:
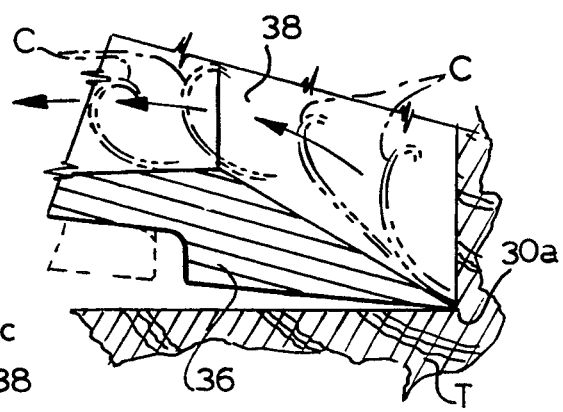
FIG. 6 is an enlarged, sectional view of the saw tooth of FIG. 5, suggesting how the wood chips, generated by the saw tooth during cutting operation through an upstanding tree, can escape through the hollows of the saw tooth and saw tooth mount, accordingly with the teachings of the invention.
Figure 10:
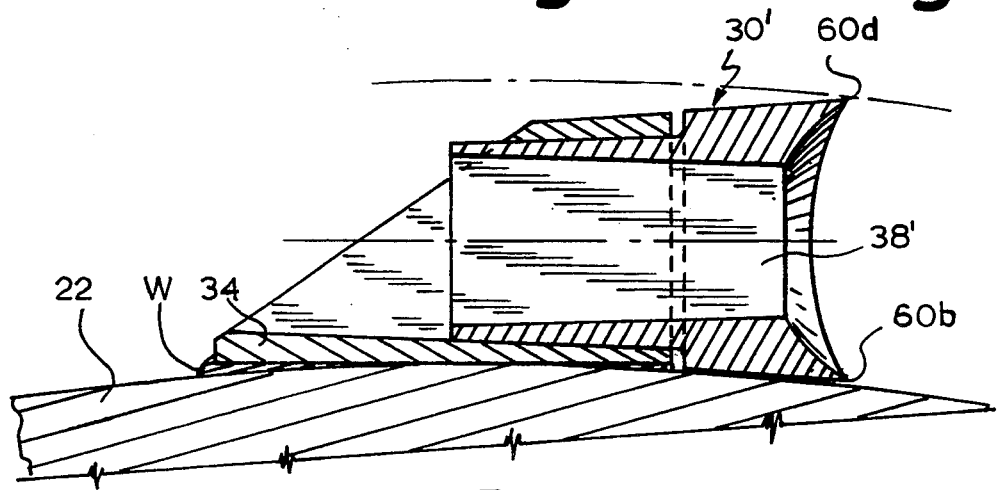

As illustrated in FIGS. 2 and 5, the tooth member 30 may be generally (frusto-conically) cylindrical, so that its sharp leading cutting edge be also circular. Alternately, and as suggested in FIGS. 2a and 10, the leading edge of the tooth member, 30', may be generally quadrangular in end view, with its sharp leading cutting edge 30a' having four concave sides 60a–60d defining four corner tips 62a–62d. Such a cross-sectionally quadrangular, tubular tooth member construction would prevent rotation of the tooth member inside the mount member. Other suitable cross-sectional shapes of tooth members are not excluded from the scope of the present invention, provided all these tooth member define within the corresponding mount member a common axial hollow or channel for through passage of the wood chip particles.

Figure 9:
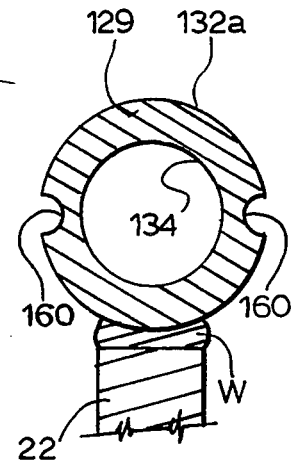
FIG. 9 is a cross-section about line 9—9 of FIG. 8.

Preferably, and as illustrated in FIG. 9, the main downstream portion 129 of mount member 128 includes at least one groove, and preferably a pair of opposite grooves, 160, 160, made lengthwisely of the external face 132a of the mount member on opposite sides thereof. Grooves 160 extend toward and open into an annular cavity 162 formed between the seat 144 and the downstream edge 138b of the tooth member 130. Grooves 160, 160, are to be used as guiding channels for sliding engagement by shaft-like hammer tools (not shown). These hammer tools are destined to enable axial hammering of the tooth member 130, for the purpose of axially detaching the latter from its mount member 128 (between which a friction fit lock engagement had priorly been established). It is understood that such tooth detachment operation would be particularly desirable in view of replacing a tooth damaged under an impact blow from a very hard part (e.g. a nail or the like) of the tree stump during tree delimbing operations with the circular saw 20.

In the embodiment of FIG. 2, the tubular tooth member is shown to be cross-sectionally circular; but it could be polygonal, for example quadrangular, particularly square; with the through-channel of the mount member being complementarily shaped. In the embodiment of FIG. 8, the reverse is true, i.e., that the body of the tubular mount member is shown to be cross-sectionally circular; but again, it could be polygonal, e.g. quadrangular, particularly square; with the trough-channel of the tooth member (into which the upstream end of the mount member will frictionally releasably engage) being complementarily shaped. In all cases where the cross-sectionally polygonal shape is considered, the saw tooth will frictionally bear against the mount member, thus releasably anchoring one to the other.

It is understood that prior art saw tooth assemblies require a bolt for securing the saw tooth to the circular saw discoid plate. With the present invention, no bolt is required: a simple friction fit interlock between the tooth member and the mount member is achieved. Only the mount member is anchored (e.g. by welding or other suitable means) to the circular saw discoid template, for use e.g. with a tree delimbing apparatus mounted e.g. to a power shovel.

The cross-section of the tubular tooth member may have a variety of dimensions, preferably ranging between approximately 0.5 to 2 inches.

Although the present tooth and mount assemblies have been shown as being anchored to the periphery of a rotatable flat circular saw, it should be understood that various alternative arrangements are envisioned to be within the scope or the present invention. For example, the circular saw could be replaced by a cutting device for a so-called "slasher" or a tree delimber. Another alternative could be to fit the tooth and mount assembly to a machinist tool, whereby in this embodiment, the tooth would not move (would remain anchored at at fixed location in space). Only the metallic piece to be machined would move relative to the tooth and mount assembly of the invention.

Therefore, any reference to a circular saw in the claims should be understood to extend to a variety of other anchoring templates, either fixed or rotatable.

Preferred materials for the tooth, particularly the tooth leading edge portion, should be very sturdy material, for example: tempered metal, carbide, a ceramic compound, or metallic tungstene.

I claim:

1. A tree delimbing circular saw including in combination:
   (a) a rotatable discoid plate member, to be power driven into rotation, said plate member defining an arcuate peripheral edge;
   (b) a number of hollow, rigid, tubular teeth members, each defining a free leading edge for tangentially shearing wood;
   (c) a corresponding number of hollow, rigid, tubular support members each support member for supporting a corresponding one of said teeth members, and defining a free trailing edge located opposite the leading edge of said tooth member;
   (d) anchoring means, fixedly anchoring said tubular support members to said peripheral edge of said discoid plate member tangentially thereof and in successively spaced fashion;
   (e) securing means, releasably interconnecting each said tooth member to the corresponding said support member into an operative position,; and
   (f) channel means, extending through the hollow of each thus formed pair of associated tooth member and support member, and defining an upstream mouth, being circumscribed by said tooth member leading edge, and a downstream mouth, being circumscribed by said support member trailing edge; said channel means extending through the plane of said discoid plate member tangentially thereof;
   wherein said upstream mouth constitutes an intake port, for entry of wood chips generated by the shearing action of said teeth members, said channel means constituting a through-passage for free passage of said wood chips through each pair of tooth member and support member, and said downstream mouth constitutes an outlet port for escape of said wood chips outwardly from said pair of tooth member and support member; wherein each said tooth member in its said operative position is so located that said channel upstream mouth extends completely radially outwardly from said peripheral edge of said discoid plate member.

2. A tree delimbing circular saw as in claim 1, wherein said securing means are friction-fit wedge-type means which releasably interlock each pair of associated tooth member and support member.

3. A tree delimbing circular saw as in claim 1, wherein said support member anchoring means positions said support members in such a way that said support members are also located completely radially outwardly from said peripheral edge of said discoid plate member, whereby the whole of said channel means is located completely radially outwardly from said peripheral edge of said discoid plate member.

4. A tree delimbing circular saw including in combination:
   (a) a rotatable discoid plate member, to be power driven into rotation, said plate member defining an arcuate peripheral edge;
   (b) a number of hollow, rigid, tubular teeth members, each defining a free leading edge for tangentially shearing wood and the like material;
   (c) a corresponding number of hollow, rigid, tubular support members, each support member for supporting a corresponding one of said teeth members, and defining a free trailing edge located opposite the leading edge of said tooth member;
   (d) anchoring means, fixedly anchoring said tubular support members to said peripheral edge of said discoid plate member, and positioning each said tubular support member at a location completely radially outwardly from said peripheral edge of said discoid plate member and positioning said support members tangentially to said peripheral edge and in successively spaced fashion;
   (e) securing means, releasably interconnecting each said tooth member to the corresponding said support member, and positioning each said tooth member at a location completely radially outwardly from said peripheral edge of said discoid plate member; and
   (f) channel means, extending through the hollow of each thus formed pair of associated tooth member and support member, and defining an upstream mouth, being circumscribed by said tooth member leading edge, and a downstream mouth, being circumscribed by said support member trailing edge; said channel means extending through the plane of said discoid plate member tangentially thereof; whereby said anchoring means and said securing means position the whole of said channel means completely radially outwardly from said peripheral edge of said discoid plate member;
   wherein said upstream mouth constitutes an intake port, for entry of wood chips generated by the shearing action of said teeth members, said channel means constituting a through-passage for free passage of said wood chips through each pair of tooth member and support member, and said downstream mouth constitutes an outlet port for escape of said wood chips outwardly from said pair of tooth member and support member.

* * * * *